United States Patent
Huang (10) Patent No.: US 11,048,059 B2
(45) Date of Patent: Jun. 29, 2021

(54) OPTICAL MODULE AND PROJECTION APPARATUS

(71) Applicant: Coretronic Corporation, Hsin-Chu (TW)

(72) Inventor: Shou-Cheng Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/836,935

(22) Filed: Apr. 1, 2020

(65) Prior Publication Data

US 2020/0319425 A1 Oct. 8, 2020

(30) Foreign Application Priority Data

Apr. 3, 2019 (CN) .......................... 201910264737.7

(51) Int. Cl.
| | |
|---|---|
| *G03B 21/14* | (2006.01) |
| *G02B 21/02* | (2006.01) |
| *G02B 7/04* | (2021.01) |
| *G02B 7/02* | (2021.01) |

(52) U.S. Cl.
CPC .............. *G02B 7/04* (2013.01); *G02B 7/021* (2013.01); *G03B 21/145* (2013.01)

(58) Field of Classification Search
CPC ...... G03B 21/142; G03B 21/145; G02B 7/04; G02B 7/02; G02B 7/026
See application file for complete search history.

(56) References Cited

U.S. PATENT DOCUMENTS

| 2017/0045724 A1* | 2/2017 | Lin ................... G02B 21/0008 |
| 2020/0301109 A1* | 9/2020 | Zhao .................. G02B 13/0015 |

FOREIGN PATENT DOCUMENTS

| CN | 101662924 | 3/2010 |
|---|---|---|
| CN | 201955529 | 8/2011 |
| CN | 103946745 | 7/2014 |
| CN | 105607211 | 5/2016 |
| CN | 205608273 | 9/2016 |
| CN | 206191513 | 5/2017 |
| CN | 106940466 | 7/2017 |
| CN | 107270191 | 10/2017 |
| CN | 209690691 | 11/2019 |
| JP | H1114876 | 1/1999 |

OTHER PUBLICATIONS

"Office Action of China Counterpart Application", dated Apr. 23, 2021, p. 1-p. 11.

* cited by examiner

*Primary Examiner* — Ryan D Howard
(74) *Attorney, Agent, or Firm* — JCIPRNET (57) ABSTRACT

An optical module and a projection apparatus including the optical module are provided. The optical module includes a base, a first lens, and a first outer frame. The base includes a channel with a first opening. The first lens covers the first opening. The first outer frame is disposed on the base. The base includes at least one first base connecting portion arranged around the first opening. The first outer frame includes at least one first outer frame connecting portion, the at least one first base connecting portion is detachably connected to the at least one first outer frame connecting portion. The projection apparatus includes a case, a light source module, the optical module, a light valve, and a projection lens module.

22 Claims, 8 Drawing Sheets

OPTICAL MODULE AND PROJECTION APPARATUS

CROSS-REFERENCE TO RELATED APPLICATION

This application claims the priority benefit of China application serial no. 201910264737.7, filed on Apr. 3, 2019. The entirety of the above-mentioned patent application is hereby incorporated by reference herein and made a part of this specification.

BACKGROUND

Technical Field

The invention relates to an optical module and a projection apparatus including the optical module, more specifically to an optical module that may be easily manufactured and assembled.

Description of Related Art

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

The projection apparatus is a display device for generating image. Through the adjustment in the focal length, the image may be enlarged and projected onto a screen or a wall. A plurality of optical modules and phosphor wheel(s) may be adopted in a projection apparatus, and the optical module may be located upstream the phosphor wheel. Generally, the optical module may include one or more optical lenses, and these optical lenses may be concave lenses, convex lenses or a combination thereof. The optical module may be applied to optical products such as projector, camera, and telescope, etc. In an existing optical module, the lens may be fixed on the base by an outer frame, and the outer frame may be attached to the base by a screw, so as to achieve the effect of clamping and fixing. However, the assembly process of the screw may cause inconvenience for automatic production, so the production and assembly procedures may be time-consuming. Furthermore, additional manufacturing processes are required to form threaded holes and/or through holes, which may be used for screws, on the base and/or the outer frame, respectively, which also cause an increase in manufacturing cost.

In addition, during the assembling procedure of the screws onto the base, slip or damage of the threaded holes s may be resulted. With the slip or the damage, the base or the screws may therefore be discarded, which causes a waste and an increase in the cost.

The above-mentioned related art is used to assist comprehending the content of the invention, and thus, the content disclosed by the related art may contain techniques that the person of ordinary skill in the art within a given field does not know. The disclosed content of the related art does not present a problem that either the invention or the embodiments intend to solve and does not present that the invention is known or acknowledged by the person of ordinary skill in the art within a given field.

SUMMARY

The invention relates to an optical module and a projection apparatus including the optical module. The optical module comprises a base and an outer frame detachable from each other, thereby reducing assembly and production complexity, so as to facilitate automatic production and to reduce cost.

Other features and advantages of the invention may be further understood by the technical features disclosed in the invention.

To achieve one, part, or all of the objectives aforementioned or other objectives, one embodiment of the invention provides an optical module. The optical module includes a base, a first lens, and a first outer frame. The base includes a channel with a first opening. The first lens covers the first opening. The first outer frame is disposed on the base. The base includes at least one first base connecting portion arranged around the first opening, the first outer frame includes at least one first outer frame connecting portion, and the at least one first base connecting portion is detachably connected to the at least one first outer frame connecting portion.

To achieve one, part, or all of the objectives aforementioned or other objectives, one embodiment of the invention provides a projection apparatus. The projection apparatus includes a case, a light source module, an optical module, a light valve, and a projection lens module. The light source module is disposed in the case to provide an illumination light beam. The optical module is disposed in the case and is located on the transmission path of the illumination light beam, the optical module includes a base, a first lens, and a first outer frame. The base includes a channel with a first opening. The first lens covers the first opening. The first outer frame is disposed on the base. The base includes at least one first base connecting portion arranged around the first opening, the first outer frame includes at least one first outer frame connecting portion, and the at least one first base connecting portion is detachably connected to the at least one first outer frame connecting portion. The at least one light valve is disposed on the transmission path of the illumination light beam and configured to covert the illumination light beam to an image light beam. The projection lens module is disposed on the transmission path of the image light beam and is configured to project the image light beam to form an image.

Based on the above, the optical module of the invention is applied to the projection apparatus, the base and the first outer frame of the optical module are connected to each other through at least one first base connecting portion and at least one first outer frame connecting portion for positioning the first lens on the base. In the optical module of the embodiments of the invention, the first lens is fixed to the base without using screws and threaded holes. To be more specific, in the optical module of the embodiments of the invention, there are none or less threaded holes arranged on the base. Correspondingly, the lens may also be fixed without using any screws or with relatively less screws. Therefore, the optical module of the embodiments of the invention is more suitable for automatic production and may be used to reduce the manufacturing cost, thereby increasing the production yield.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
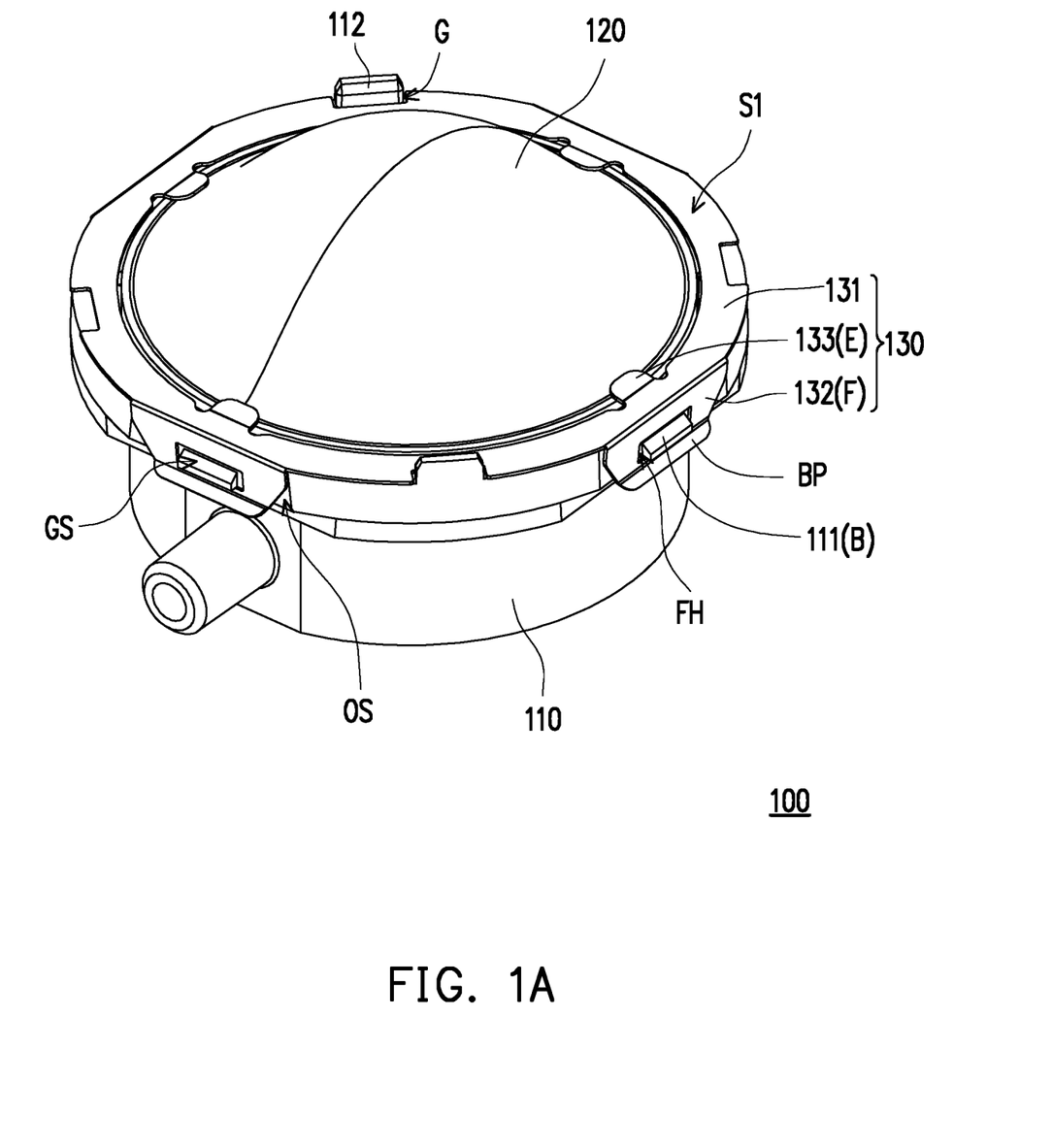
FIG. 1A is a three-dimensional schematic view of an optical module according to one embodiment of the invention.
Figure 1B:
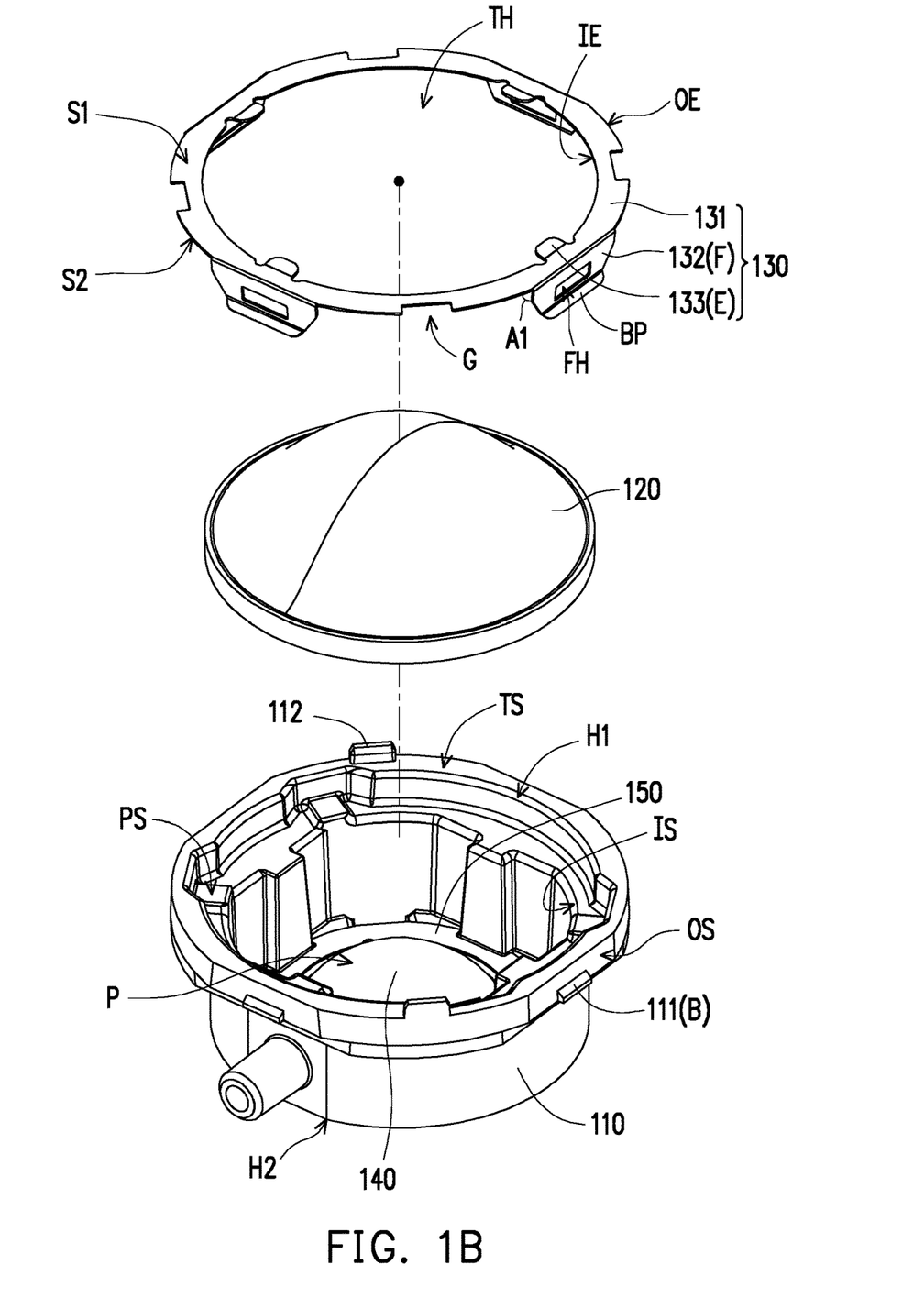
FIG. 1B is an exploded view illustrating components of the optical module in FIG. 1A.

Referring to FIG. 1A and FIG. 1B, an optical module 100 of the embodiment includes a base 110, the first lens 120, and the first outer frame 130. The base 110 includes a channel P inside, the channel P penetrates through the base 110, and the channel P includes the first opening H1 and the second opening H2. Additionally, the base 110 may be made of an opaque material (such as metal), and the channel P may serve as a transmission path for a light beam. In the embodiment, the first lens 120 is fixed to the base 110 by using the first outer frame 130, and the first lens 120 covers the first opening H1 of the channel P. The light beam may be transmitted in the channel P and then may pass through the first lens 120. In the embodiment, the first lens 120 may be a convex lens, for example. In other embodiments, the first lens may also be a concave lens or other types of lens. The first outer frame 130 is disposed on the base 110 and configured to fix the first lens 120 to the base 110.

As shown in FIG. 1A and FIG. 1B of the embodiment, the base 110 includes at least one first base connecting portion 111 arranged around the first opening H1. In some embodiments, the first outer frame 130 includes the first annular frame body 131 and the first annular frame body 131 encircles to form a through hole TH. In some embodiments, the first annular frame body 131 includes an outer edge OE and an inner edge IE, and the first outer frame 130 further includes at least one first outer frame connecting portion 132 arranged along the first annular frame body 131 and connected to the outer edge OE. In the embodiment, the at least one first outer frame connecting portion 132 of the first outer frame 130 and the at least one first base connecting portion 111 of the base 110 are detachably connected to each other, so as to fix the first lens 120 to the base 110. For example, in some embodiments, the first outer frame 130 and the base 110 are respectively located at two sides of the first lens 120. The at least one first outer frame connecting portion 132 of the first outer frame 130 and the at least one first base connecting portion 111 of the base 110 are connected to each other, so that the first lens 120 is clamped between the first outer frame 130 and the base 110.

Furthermore, when the first lens 120 is clamped between the first outer frame 130 and the base 110, the first lens 120 covers the first opening H1 of the channel P, and the first lens 120 is exposed from the through hole TH of the first outer frame 130. For example, in the embodiment that the first lens 120 is a convex lens, the first lens 120 may protrude from the through hole TH of the first outer frame 130, but the invention is not limited thereto. In other embodiments of the invention that the first lens 120 is a flat lens or a concave lens, the first lens 120 may not protrude from the through hole TH. It should be noted here, the term "protrude" may be defined as protruding in a direction from the base 111 to the first outer frame 130, and the direction is the direction from the bottom to the top in the FIG. 1A and FIG. 1B. However, this definition is for the purpose of understanding and does not limit the invention.

Figure 1C:
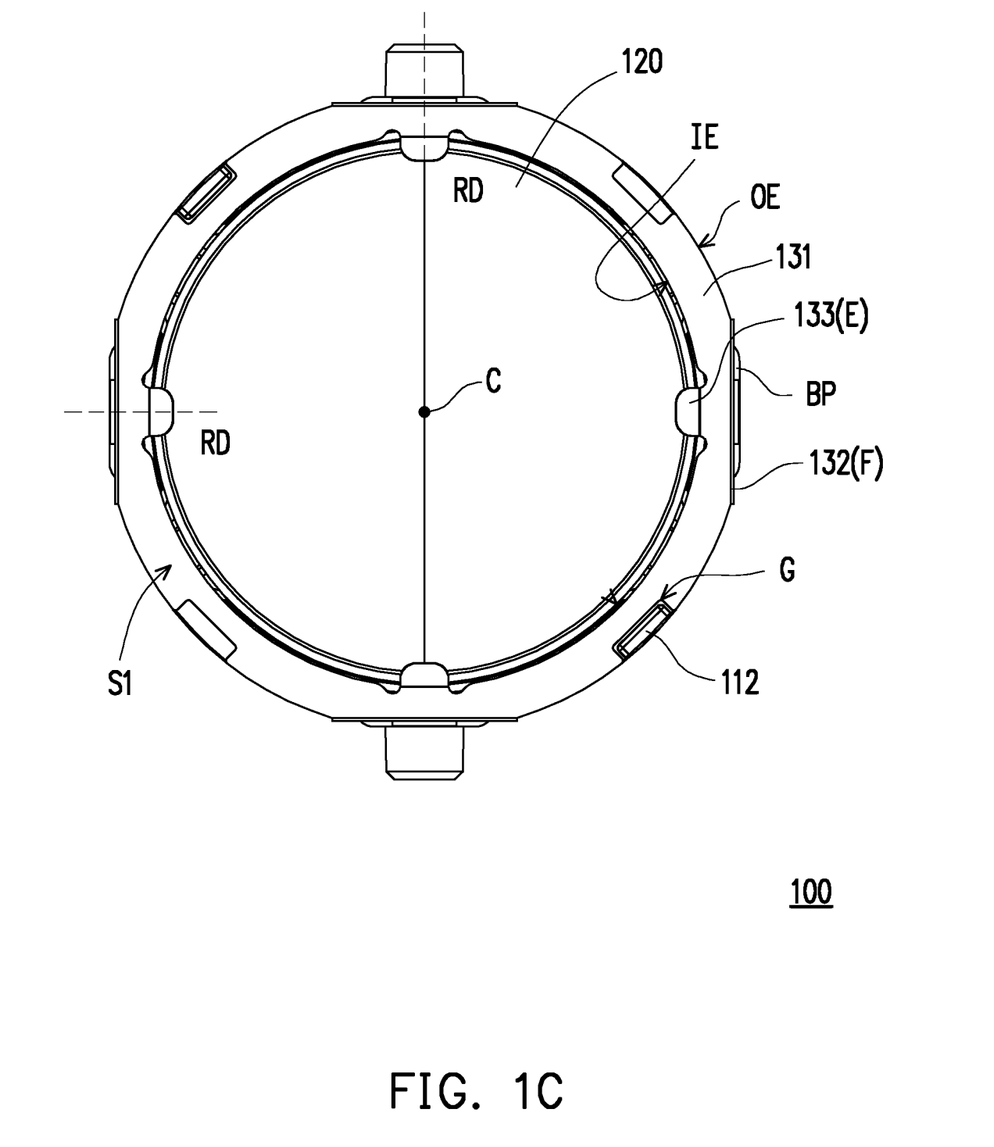
FIG. 1C is a schematic top view of the optical module in FIG. 1A.

Referring to FIG. 1A to FIG. 1C, the first outer frame 130 further includes at least one first pressing portion 133. In some embodiments, the at least one first pressing portion 133 is connected to the inner edge IE of the first annular frame body 131. The at least one first pressing portion 133 extends in a radial direction RD from the inner edge IE of the first annular frame body 131 toward a center C of the first outer frame 130 and configured to contact with the first lens 120, so that the first lens 120 leans against the base 110 and covers the first opening H1.

Figure 1D:
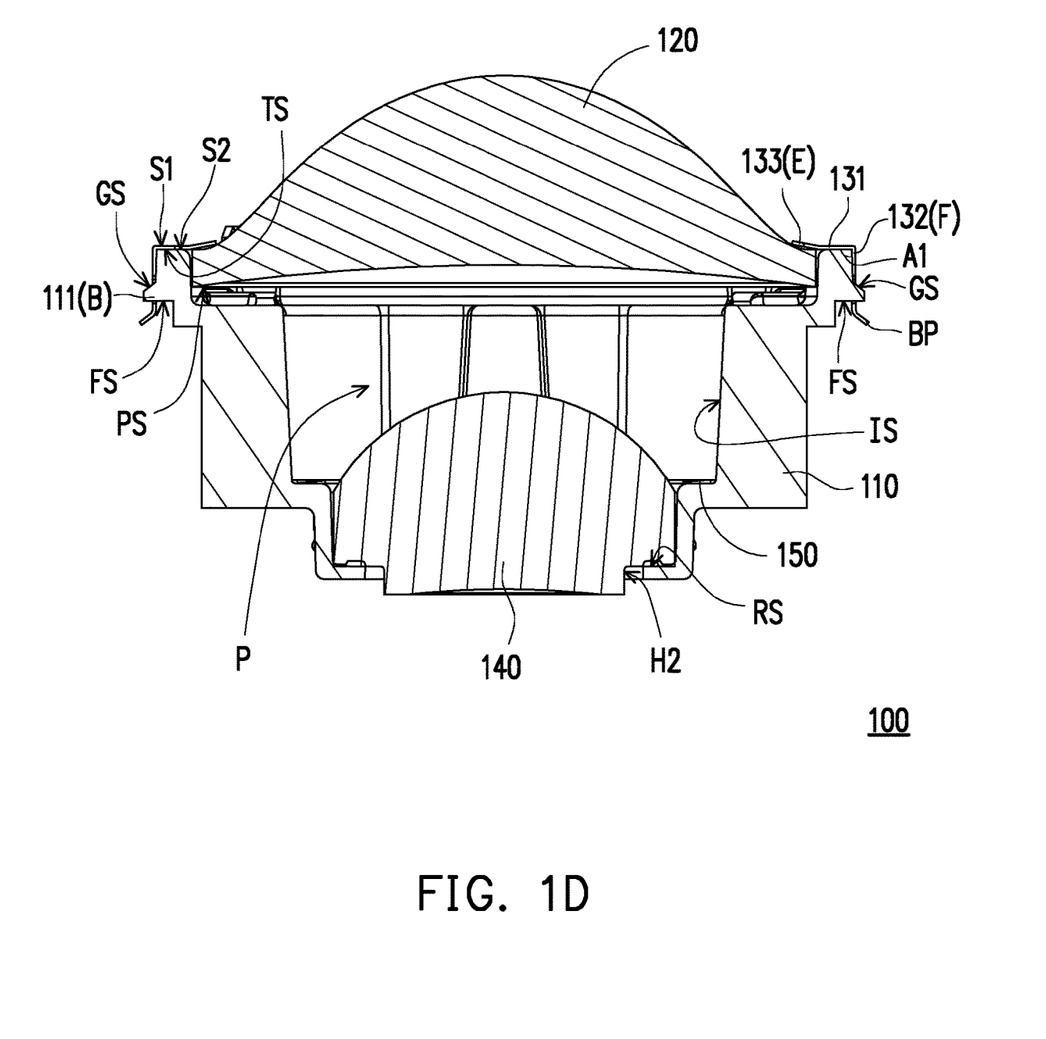
FIG. 1D is a cross-sectional schematic view illustrating the first outer frame being connected to a base in the optical module in FIG. 1A.
Figure 1E:
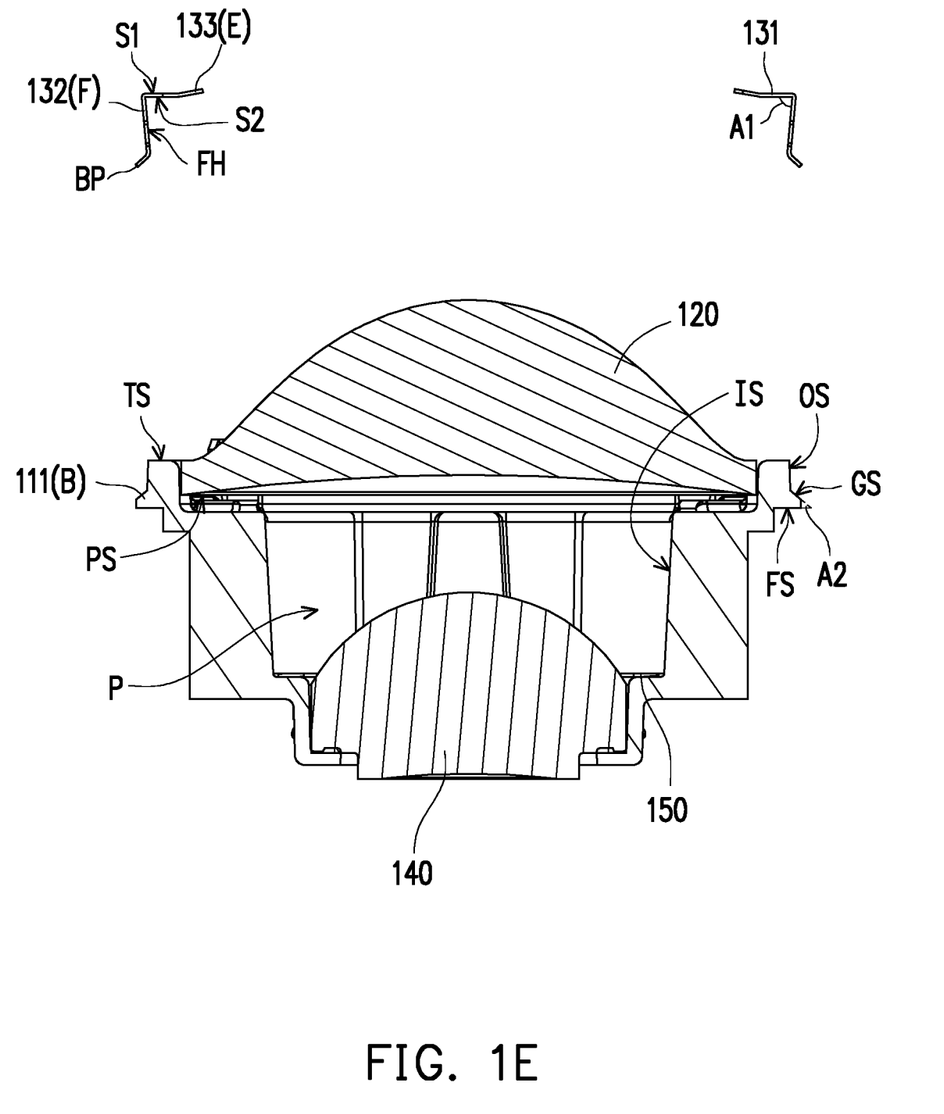
FIG. 1E is a partial cross-sectional schematic view illustrating the first outer frame being separated from the base in the optical module in FIG. 1D.

In the embodiment shown in FIG. 1B, FIG. 1D, and FIG. 1E, the first annular frame body 131 of the first outer frame 130 has a sheet shape and includes the first surface S1 and the second surface S2. The first surface S1 and the second surface S2 are opposite and parallel to each other. In some embodiments, the first outer frame 130 may be made of metal materials including aluminum or stainless steel as an example. In the embodiment, the at least one first outer frame connecting portion 132 of the first outer frame 130 may be bent from the outer edge OE of the first annular frame body 131 in a direction from the first surface S1 and the second surface S2. In further embodiments, the at least one first outer frame connecting portion 132 may include a plurality of fasteners F. The fasteners F are disposed at intervals along the outer edge OE of the first annular frame body 131 and may be bent and extended downwards from the outer edge OE of the first annular frame body 131 in a direction from the first surface S1 to the second surface S2. In the embodiment, each of the fasteners F includes a fastening hole FH. In further embodiments, the at least one first base connecting portion 111 may include a plurality of bumps B, and the bumps B are arranged around the first opening H1 of the channel P. In some embodiments, the number of the fasteners F may be equal to the number of the bumps B, but the invention is not limited thereto. In the embodiment, when each of the fasteners F is connected to the corresponding one of the bumps B, the bump B passes through the fastening hole FH of the fastener F. Furthermore, in the embodiment, the size of the fastening hole FH may be greater than the size of each of the bumps B, so that the bump B may pass through the fastening hole FH.

In some embodiments, as shown in FIG. 1B and FIG. 1E, when the first outer frame 130 is separated from the base 110, an included angle A1 between the at least one first outer frame connecting portion 132 and the second surface S2 may be an acute angle, such as an angle of 80 degrees or an angle smaller than 90 degrees. In the embodiment, when the at least one first outer frame connecting portion 132 of the first outer frame 130 is connected to the at least one first base connecting portion 111 of the base 110, the base 110 pushes against the at least one first outer frame connecting portion 132, so that the at least one first outer frame connecting portion 132 is elastically deformed to be substantially perpendicular to the first annular frame body 131 and therefore to be substantially perpendicular to the first surface S1 or the second surface S2 of the first annular frame body 131. For example, in the embodiment shown in FIG. 1D, when the fastener F is fastened to the bump B, the fastener F is elastically deformed so that the included angle A1 between the fastener F and the second surface S2 of the first annular frame body 131 is equal to 90 degrees or an obtuse angle slightly greater than 90 degrees. Since the fastener F may have a tendency to maintain the included angle A1 as an acute angle (such as an angle of 80 degrees), the fastener F may be firmly fastened with the bump B.

As shown in FIG. 1D, when the at least one first outer frame connecting portion 132 is connected to the at least one first base connecting portion 111, the second surface S2 of the first annular frame body 131 is in contact with the top surface TS of the base 110. The included angle A1 between the at least one first outer frame connecting portion 132 and the second surface S2 is a right angle or an obtuse angle slightly greater than 90 degrees. In the embodiment, when the first outer frame 130 and the base 110 are separated from each other, the at least one first outer frame connecting portion 132 is not pushed by the base 110, so the included angle A1 between the at least one first outer frame connecting portion 132 and the second surface S2 is restored to be an acute angle.

More specifically, referring to FIGS. 1B and 1E, when the first outer frame 130 is separated from the base 110, each of the fasteners F is not fastened with the corresponding one of the bumps B, the included angle A1 between each of the fasteners F and the second surface S2 of the first annular frame body 131 is an acute angle, such as an angle of 80 degrees, and each of the fasteners F is obliquely extended from the outer edge OE with the tendency to maintain the included angle A1 as an acute angle. Referring to FIG. 1D, when the first outer frame 130 is connected to the base 110, each of the fasteners F is fastened with the corresponding one of the bumps B, the base 110 pushes against each of the fasteners F, so that the included angle A1 between each of the fasteners F and the second surface S2 of the first annular frame body 131 becomes greater so as to be equal to 90 degrees or more. Therefore, each of the fasteners F is elastically deformed and the elastic force thereof may be accumulated, such that each of the fasteners F of the first outer frame 130 is fastened with the base 110 with the elastic force.

Referring to FIG. 1D and FIG. 1E, in some embodiments, each of the fasteners F includes a bending portion BP formed at an end, which may be far away from the first annular frame body 131, of each of the fastener F, and each of the bending portions BP is obliquely extended in a direction away from the base 110. Each of the bending portions BP is configured to assist the detachable connection between the fastener F and the bump B. For example, when an external force is applied on each of the bending portions BP, each of the fasteners F may be pulled so that each of the fasteners F is fastened with the corresponding bump B or separated from the corresponding bump B. In such a way, the first outer frame 130 may be assembled to the base 110 or may be detached from the base 110.

In some embodiments, each of the bumps B extends outwards from the first outer surface OS of the base 110 in the radial direction RD (shown in FIG. 1E), and each of the bumps B includes a guiding surface GS (shown in FIG. 1A and FIG. 1D) and a fitting surface FS (shown in FIG. 1D). The guiding surface GS is located closer to the first opening H1 of the channel P than the fitting surface FS, and the guiding surface GS is inclined with respect to the fitting surface FS. For example, an included angle A2 (shown in FIG. 1E) between the guiding surface GS and the fitting surface FS is an acute angle smaller than 90 degrees. Additionally, the extending direction of the fitting surface FS may be parallel to the radial direction RD, and the guiding surface GS is gradually inclined outwards. In this configuration, when the bump B penetrates through the corresponding fastening hole FH, the guiding surface GS may be preferable in facilitating and guiding the assembling or dissembling of the fastener F with the bump B.

Referring to the FIG. 1C and FIG. 1D, in some embodiments, the at least one first pressing portion 133 may include a plurality of elastic sheets E. The elastic sheets E are disposed at intervals along the inner edge IE of the first annular frame body 131, and each of the elastic sheets E is configured to contact/press the first lens 120 so that the first lens 120 is fixed to the base 110. In the embodiment that the first lens 120 is a convex lens, each of the elastic sheets E is in contact with the edge of the first lens 120, and the first lens 120 presses against the base 110.

Referring to FIG. 1A and FIG. 1B, in some embodiments, the first outer frame 130 may include at least one positioning slot G disposed along the outer edge OE. The base 110 includes at least one positioning protrusion 112 disposed around the first opening H1. When the first outer frame 130 is connected with the base 110, the at least one positioning protrusion 112 of the base 110 is engaged within the at least one positioning slot G of the first outer frame 130, so as to assist in aligning the first outer frame 130 with the base 110 and to prevent the first outer frame 130 from shifting on the base 110. For example, the at least one positioning slot G may be a plurality of square notches disposed along the outer edge OE of the first annular frame body 131, and these square notches are disposed at intervals. However, the invention is not limited thereto. In other embodiments, the positioning slot G may also be a notch having different shapes. In some embodiments, a plurality of positioning slots G and a plurality of fasteners F are alternately disposed along the outer edge OE of the first annular frame body 131.

In some embodiments, the base 110 includes the first step surface PS adjacent to the first opening H1, and the first step surface PS is disposed along an inner surface IS of the base 110 and is perpendicular to the inner surface IS. The periphery of the bottom of the first lens 120 leans against the first step surface PS. In this configuration, the first step surface PS is configured to support the periphery of the first lens 120, so that the center portion of the first lens 120 is suspended inside the base 110 and is aligned with the channel P.

In some embodiments, referring to FIG. 1B and FIG. 1D, the optical module 100 includes the second lens 140 and the second outer frame 150. The channel P of the base 110 further includes the second opening H2. In the embodiment, the second outer frame 150 is disposed inside the base 110. With the second outer frame 150 being fixed to the base 110, the second lens 140 covers the second opening H2.

Figure 1F:
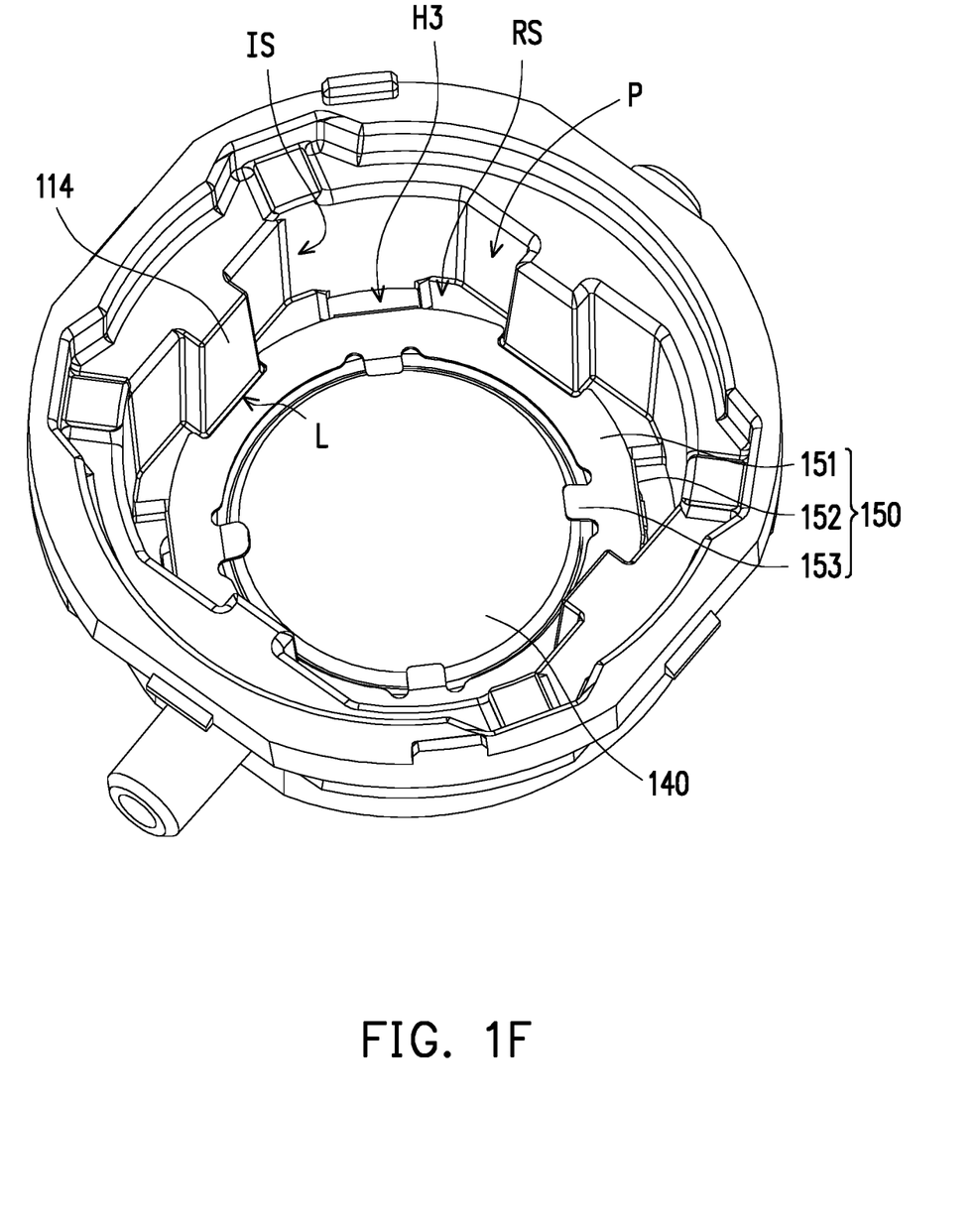
FIG. 1F is a three-dimensional schematic view illustrating some components of the optical module in FIG. 1A.
Figure 1G:
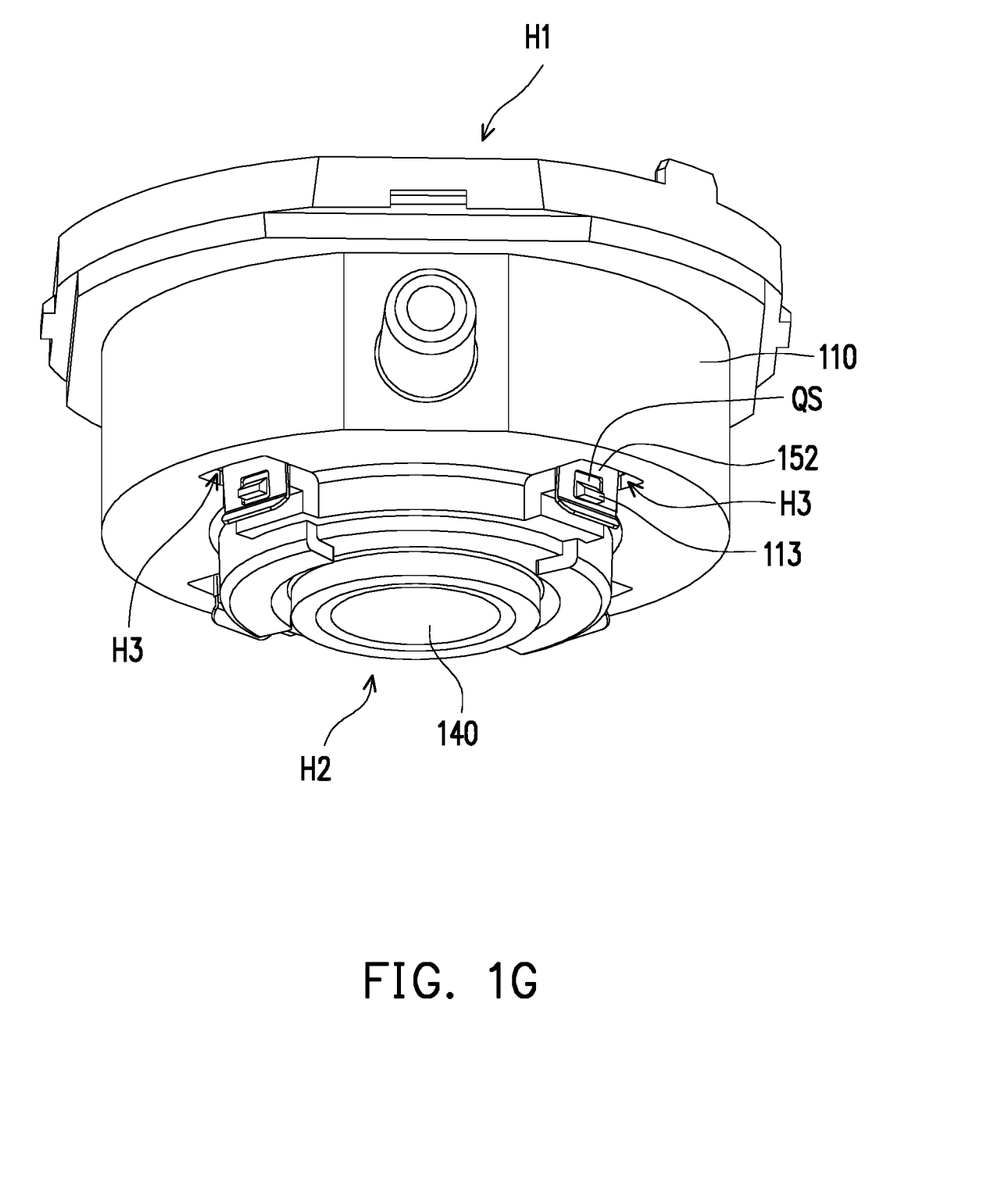
FIG. 1G is a three-dimensional schematic view illustrating the optical module in FIG. 1F viewed from another angle.

Furthermore, referring to FIG. 1F and FIG. 1G, FIG. 1F is a three-dimensional schematic view illustrating the connection of the second outer frame and the base of the optical module in FIG. 1A. FIG. 1G is a three-dimensional schematic view illustrating the optical module in FIG. 1F at another view.

In the embodiment in FIG. 1F and FIG. 1G, the base 110 (shown in FIG. 1B) further includes at least one second base connecting portion 113. In the embodiment, the at least one second base connecting portion 113 extends outwards from the second outer surface QS of the base and arranged at intervals around the second opening H2. Furthermore, the second outer frame 150 may include the second annular frame body 151, at least one second outer frame connecting portion 152 disposed on the second annular frame body 151, and at least one second pressing portion 153 disposed on the second annular frame body 151. In the embodiment, the second outer frame connecting portion 152 extends outwards from the second annular frame body 151, and the second pressing portion 153 extends inwardly from the second annular frame body 151. For example, the structure of the second outer frame 150 may be similar to the structure of the first outer frame 130 and will not be described in detail hereinafter.

In some embodiments, as shown in FIG. 1G, the at least one second outer frame connecting portion 152 may be detachably connected to the at least one second base connecting portion 113, and as shown in FIG. 1F, the at least one second pressing portion 153 is configured to contact/press the periphery of the second lens 140, so that the second lens 140 inside leans against the base 110 and covers the second opening H2 of the channel P.

In some embodiments, the base 110 further includes the second step surface RS adjacent to the second opening H2, the second step surface RS is disposed along the inner surface IS (shown in FIG. 1B and FIG. 1D) of the base 110 and is perpendicular to the inner surface IS. The periphery of the bottom of the second lens 140 leans against the second step surface RS. Furthermore, as shown in FIG. 1F, the second step surface RS may include at least one step surface through hole H3 penetrating through the second step surface RS, and the step surface through holes H3 are arranged at intervals around the second opening H2. In the embodiment, when the second lens 140 is fixed to the base 110 by using the second outer frame 150, the second outer frame connecting portions 152 of the second outer frame 150 respectively penetrate through the step surface through holes H3 of the second step surface RS to connect to the at least one second base connecting portion 113 (shown in FIG. 1G) of the base 110.

In some embodiments, as shown in FIG. 1F, the base 110 may further include at least one position-limiting column 114 disposed on the inner surface IS of the base 110. The at least one position-limiting column 114 may protrude inwardly from the inner surface IS of the base 110. In the embodiment, the second outer frame 150 may include at least one positioning slot L. When the second outer frame 150 is connected with the base 110, the position-limiting column 114 of the base 110 is engaged within the positioning slot L of the second outer frame 150, so as to assist in aligning the second outer frame 150 with the base 110 and in preventing the second outer frame 150 from shifting on the base 110. For example, the structure of the positioning slot L may be similar to the structure of the positioning slot G and will not be described in detail hereinafter.

Figure 2:
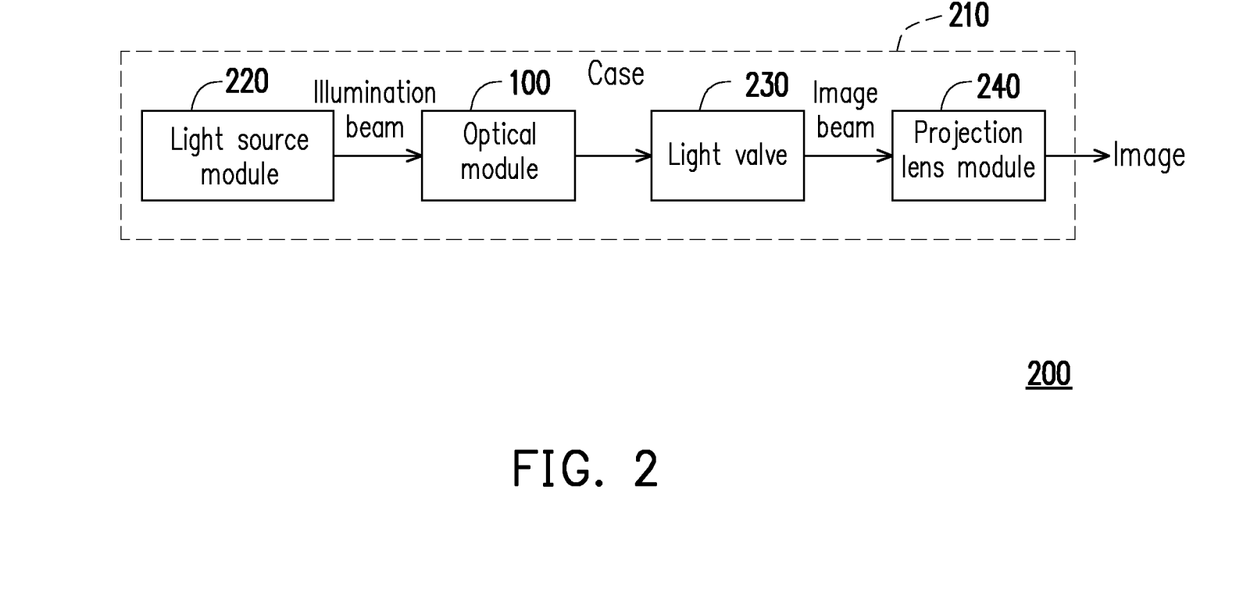
FIG. 2 is a block diagram of a projection apparatus according to another embodiment of the invention.

FIG. 2 is a block diagram of a projection apparatus according to another embodiment of the invention.

Referring to the FIG. 1A and FIG. 2, the optical module 100 in the embodiment is applied to a projection apparatus. In one embodiment, a projection apparatus 200 includes a case 210, a light source module 220, a light valve 230, and a projection lens module 240. The case 210 may be made of materials, such as metal (e.g., aluminum), plastic, or resin (e.g., white polycarbonate, white polyoxygen), etc. The other elements of the projection apparatus 200 are at least partially located inside the case 210, and the case 210 is used to support and/or accommodate the other elements. In some embodiments, some elements, such as the projection lens module 240, of the projection apparatus 200 may extend out of the case 210. In some embodiments, the light source module 220 is disposed inside the case 210 and provides an illumination light beam. The light source module 220 may be a high brightness halogen bulb as an example, but the invention is not limited thereto. In other embodiments, the light source module 220 may include at least one light emitting element (not shown) and may be configured to provide and illumination light beam. For example, the light source module 220 may include a plurality of laser diodes, a plurality of light emitting diodes, or a plurality of other solid-state illumination sources, which are arranged in an array. The optical module 100 is disposed inside the case, is located on the transmission path of the illumination light beam, and is configured to converge the illumination light beam or to make adjustment in the focal length directing at converging the illumination light beam. The illumination light beam passes through the second lens 140 and the first lens 120 sequentially. In some embodiments, the light valve 230 is disposed on the transmission path of the illumination light beam and is configured to covert the illumination light beam passing through the optical module 100 to an image light beam. For example, the light valve 230 may be a digital micromirror device (DMD). The image light beam may be reflected by the light valve 230 to the projection lens module 240. In other embodiments, the light valve 230 may be a transmissive spatial light modulator, such as a transparent liquid crystal panel. The model and type of the light valve 230 are not limited in the invention. In some embodiments, the projection lens module 240 may be disposed on the transmission path of the image light beam and is aligned with the light valve 230, and the projection lens module 240 is configured to project the image light beam. Furthermore, the projection lens module 240 may include a plurality of lenses to enlarge the image and project the enlarged image onto the screen or the wall.

In summary, the optical module of the invention is applied to the projection apparatus and includes the base and the first outer frame that are detachable from each other. The at least one first base connecting portion and the at least one first outer frame connecting portion are connected with each other for positioning the first lens on the base. In the optical module of the embodiments of the invention, the first lens is fixed to the base without using screws and threaded holes. To be more specific, in the optical module of the embodiments of the invention, there are none or less threaded holes arranged on the base. Correspondingly, the lens may also be fixed without using any screws or with relatively less screws. Therefore, the optical module of the embodiments of the invention is more suitable for automatic production and may be used to reduce the manufacturing cost, thereby increasing the production yield.

It will be apparent to those skilled in the art that various modifications and variations may be made to the structure of the invention without departing from the scope or spirit of the invention. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Moreover, "first", "second", etc. mentioned in the specification and the claims are merely used to name the elements and should not be regarded as limiting the upper or lower bound of the number of the components/devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Moreover, these claims may refer to use "first", "second", etc. following with noun or element. Such terms should be understood as a nomenclature and should not be construed as giving the limitation on the number of the elements modified by such nomenclature unless specific number has been given. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present invention is intended to be dedicated to the public regardless of whether the element or component is explicitly recited in the following claims.

What is claimed is:

1. An optical module, comprising a base, a first lens, and a first outer frame, wherein:
   the base includes a channel with a first opening,
   the first lens covers the first opening, and
   the first outer frame is disposed on the base,
   wherein the base comprises at least one first base connecting portion arranged around the first opening, the first outer frame comprises at least one first outer frame connecting portion, and the at least one first base connecting portion is detachably connected to the at least one first outer frame connecting portion,
   wherein the first outer frame further comprises:
      a first annular frame body, comprising an outer edge and an inner edge, wherein the at least one first outer frame connecting portion is connected to the outer edge; and
      at least one first pressing portion, extending in a radial direction from the inner edge toward a center of the first outer frame and configured to contact with the first lens so that the first lens leans against the base and covers the first opening.

2. An optical module according to claim 1, wherein the first annular frame body has a sheet shape, when the at least one first outer frame connecting portion is connected to the at least one first base connecting portion, the at least one first outer frame connecting portion is perpendicular to the first annular frame body.

3. The optical module according to claim 1, wherein the first outer frame includes a through hole, and the first lens is exposed from the through hole.

4. The optical module according to claim 1, wherein the at least one first pressing portion comprises a plurality of elastic sheets, and the plurality of elastic sheets are disposed at intervals along the inner edge of the first annular frame body.

5. The optical module according to claim 1, wherein the at least one first outer frame connecting portion comprises a fastener, the at least one first base connecting portion comprises a bump, and wherein the fastener includes a fastening hole, and when the fastener is connected to the bump, the bump passes through the fastening hole.

6. The optical module according to claim 5, wherein the fastener includes a bending portion, the bending portion is formed at an end of the fastener, and the end of the fastener is far away from the first annular frame body, and wherein the bending portion is configured to assist the detachable connection between the fastener and the bump.

7. The optical module according to claim 5, wherein the bump extends outwards from a first outer surface of the base in a radial direction, and the bump includes a guiding surface and a fitting surface, and wherein the guiding surface is located closer to the first opening of the channel than the fitting surface, and the guiding surface is inclined with respect to the fitting surface.

8. The optical module according to claim 1, wherein the first outer frame comprises at least one positioning slot disposed along the outer edge, the base comprises at least one positioning protrusion disposed around the first opening, and the at least one positioning protrusion is engaged within the at least one positioning slot.

9. The optical module according to claim 1, wherein the base includes a first step surface adjacent to the first opening, the first step surface is disposed along an inner surface of the base and is perpendicular to the inner surface, and a periphery of a bottom of the first lens leans against the first step surface.

10. The optical module according to claim 1, wherein the first lens is a convex lens.

11. An optical module, comprising a base, a first lens, and a first outer frame, wherein:
the base includes a channel with a first opening,
the first lens covers the first opening, and
the first outer frame is disposed on the base,
wherein the base comprises at least one first base connecting portion arranged around the first opening, the first outer frame comprises at least one first outer frame connecting portion, and the at least one first base connecting portion is detachably connected to the at least one first outer frame connecting portion,
wherein the channel further comprises a second opening, the optical module further comprises a second lens and a second outer frame, the second lens covers the second opening, and the second outer frame is configured to fix the second lens to the base.

12. The optical module according to claim 11, wherein the base further comprises:
at least one second base connecting portion, extending outwards from a second outer surface of the base and arranged at intervals around the second opening.

13. The optical module according to claim 12, wherein the second outer frame comprises:
a second annular frame body;
at least one second outer frame connecting portion, disposed on the second annular frame body; and
at least one second pressing portion, disposed on the second annular frame body,
wherein the at least one second outer frame connecting portion extends outwards from the second annular frame body and the at least one second pressing portion extends inwardly from the second annular frame body, wherein the at least one second outer frame connecting portion is detachably connected to the at least one second base connecting portion, and the at least one second pressing portion is configured to contact the second lens, so that the second lens leans against the base and covers the second opening.

14. The optical module according to claim 13, wherein the base further includes a second step surface adjacent to the second opening, the second step surface is disposed along an inner surface of the base and is perpendicular to the inner surface, and a periphery of a bottom of the second lens leans against the second step surface.

15. The optical module according to claim 14, wherein the second step surface comprises at least one step surface through hole penetrating through the second step surface, and the at least one step surface through hole is arranged at intervals around the second opening.

16. The optical module according to claim 15, wherein the at least one second outer frame connecting portion of the second outer frame is respectively penetrates through the at least one step surface through hole of the second step surface to connect to the at least one second base connecting portion of the base.

17. A projection apparatus comprising a case, a light source module, an optical module, a light valve, and a projection lens module, wherein:
the light source module is disposed in the case to provide an illumination light beam,
the optical module is disposed in the case and is located on a transmission path of the illumination light beam, the optical module comprises a base, a first lens, and a first outer frame, wherein:
the base includes a channel with a first opening,
the first lens covers the first opening, and
the first outer frame is disposed on the base,
wherein the base comprises at least one first base connecting portion arranged around the first opening, the first outer frame comprises at least one first outer frame connecting portion, and the at least one first base connecting portion is detachably connected to the at least one first outer frame connecting portion,
the light valve is disposed on the transmission path of the illumination light beam and is configured to convert the illumination light beam to an image light beam; and
the projection lens module is disposed on a transmission path of the image light beam and is configured to project the image light beam to form an image.

18. The projection apparatus according to claim 17, wherein the first outer frame further comprises:
a first annular frame body, comprising an outer edge and an inner edge, wherein the at least one first outer frame connecting portion is connected to the outer edge; and
at least one first pressing portion, extending in a radial direction from the inner edge toward a center of the first outer frame and configured to contact with the first lens so that the first lens leans against the base and covers the first opening.

19. The projection apparatus according to claim 18, wherein the first annular frame body has a sheet shape, when the at least one first outer frame connecting portion is connected to the at least one first base connecting portion, the at least one first outer frame connecting portion is perpendicular to the first annular frame body.

20. The projection apparatus according to claim 19, wherein the at least one first pressing portion comprises a plurality of elastic sheets, and the plurality of elastic sheets are disposed at intervals along the inner edge of the first annular frame body.

21. The optical module according to claim 17, wherein the at least one first outer frame connecting portion comprises a fastener, the at least one first base connecting portion comprises a bump, and wherein the fastener includes a fastening hole, and when the fastener is connected to the bump, the bump passes through the fastening hole.

22. The projection apparatus according to claim 17, wherein the base includes a first step surface adjacent to the first opening, the first step surface is disposed along an inner surface of the base and is perpendicular to inner surface, and a periphery of a bottom of the first lens leans against the first step surface.

\* \* \* \* \*